J. J. CAIN.
PISTON RING.
APPLICATION FILED MAR. 19, 1917.
1,263,850.
Patented Apr. 23, 1918.
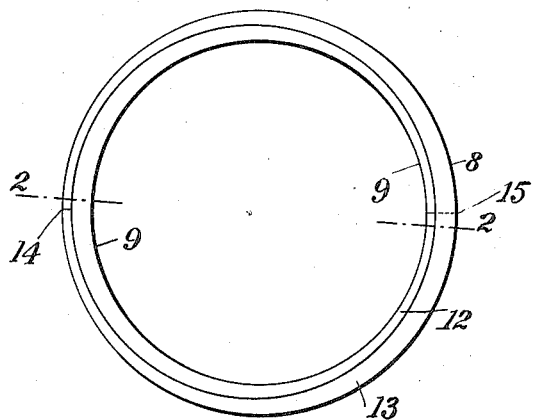
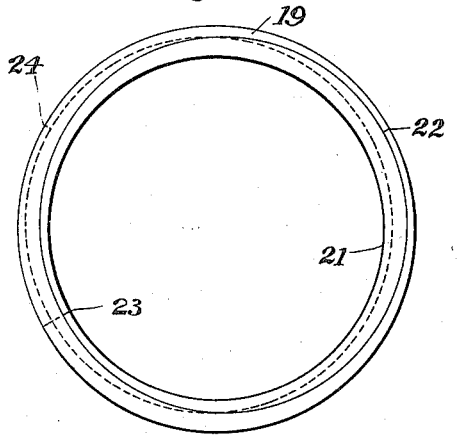
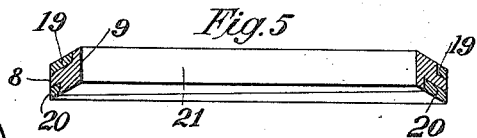
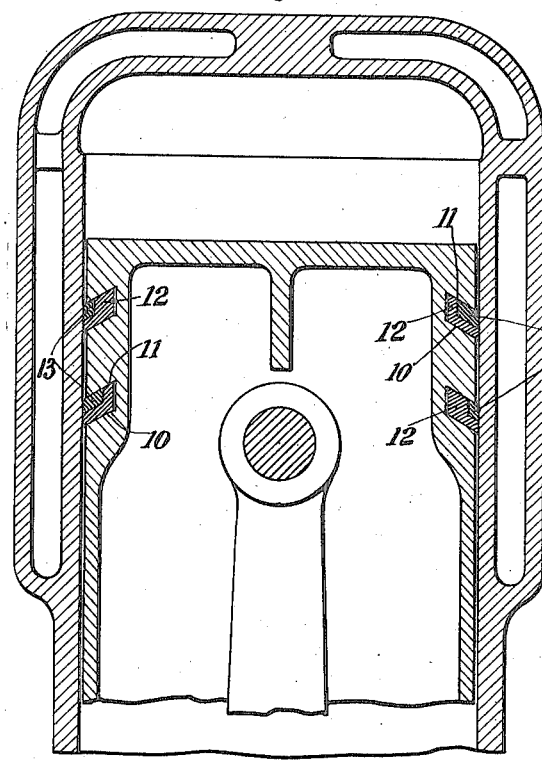
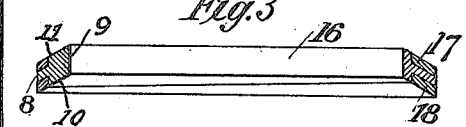
Inventor
John J. Cain.
By his Attorney
Alfred Shedlock

UNITED STATES PATENT OFFICE.

JOHN J. CAIN, OF BAYONNE, NEW JERSEY.

PISTON-RING.

1,263,850.

Specification of Letters Patent.   Patented Apr. 23, 1918.

Application filed March 19, 1917.   Serial No. 155,676.

*To all whom it may concern:*

Be it known that I, JOHN J. CAIN, residing at Bayonne, county of Hudson, State of New Jersey, have invented new and useful Improvements in Piston-Rings, of which the following is a specification.

The piston packing forming the subject of this invention is of a compound character, it consists of rings so formed that when assembled the inner and outer walls of the completed ring are concentric, each of the rings constituting a part of the outer wall, and the circular contacting parts of the rings are eccentric to the inner and outer walls. This eccentricity of one of the surfaces of the component rings results in a gradual reduction in thickness from the large to the small parts of the rings, and, with the small parts slit, the resiliency is such that all parts of the rings will bear with substantially uniform pressure against the cylinders containing pistons equipped with such rings. The light slit portion of each component ring is in line with an unslit portion of another ring so that no continuous break occurs in any part of the completed ring.

In the preferred adaptation of the invention the side walls are at an angle to the inner and outer circular walls. One of the component rings, viz., the main or bull ring, is so formed as to compose the whole of the circular inner wall, its outer wall being recessed toward the inner wall in such manner that the circular wall of said recess is eccentric to the inner wall. This recess is filled by a ring having the inner circular wall correspondingly eccentric to its outer wall. The rings by reason of their eccentric connection will retain proper relation to one another, with the slit of one in line with the solid part of another, without being locked or fastened together against relative rotation.

The accompanying drawings illustrate embodiments of various forms of the essential features of the invention.

Figure 1, is a plan or face view of a compound piston ring made according to this invention.

Fig. 2, a conventional view of a piston and cylinder, showing two compound rings, in cross section on line 2, 2, Fig. 1, seated in angularly arranged grooves formed in the piston, the contacting surfaces of the component rings being at an angle to the axis.

Fig. 3, a section of an angular compound ring showing an auxiliary ring on each side of the main or bull ring.

Fig. 4, a plan view of a ring similarly constructed to that shown in Fig. 3, with the eccentricity of the two auxiliary rings angularly arranged.

Fig. 5, a transverse section of Fig. 4.

The piston rings illustrated in Figs. 1 and 2 have the inner and outer walls 9 and 8, concentric and the opposed side walls 10 and 11, parallel and at an angle to the inner and outer walls, adapting them to be applied to pistons having angularly arranged grooves, as shown at Fig. 2. In this view the main or bull ring 12, is cut away or recessed at one side with the vertical wall, or wall parallel to walls 8 and 9, eccentric to the walls 8 and 9, and the side or face wall inclined and parallel to the side wall 10, imparting to the cross sections of said ring L form of varying proportions. The small or auxiliary ring 13, is formed to fill said recess, its lightest or narrowest part, which is in line with the widest part of the vertical limb of ring 12, is slit, as at 14, and the narrowest part of ring 12, also slit, is in line with the widest part of ring 13, as at 15. It is desirable that the contacting side faces of the component parts of the ring be parallel with the conical side faces; whereby the force of the steam, &c., on the pressure side of the ring, will, by the inclination of the contacting surfaces, tend to cause the auxiliary ring to snugly press against the cylinder in which the ring is working. This applies to the modifications shown in Fig. 3, 4 and 5, in which two auxiliary rings are employed.

The compound ring Fig. 3, is similar in shape to the rings of Fig. 2, and the side view Fig. 1, applies to Fig. 3. The bull ring 16, is eccentrically recessed on both sides, giving it a T shape in cross section. In the recesses are placed corresponding eccentric rings 17, and 18. The ring shown at Figs. 4 and 5, is characteristically similar to Fig. 3, but the rings 19 and 20, are set in different angular positions on the bull ring 21, so that their respective slits 22, 23 and 24, occupy different positions in the ring, each slit being in line with the solid portions of two rings.

It is obvious that the contacting side surfaces of the two parts are conical as they are parallel to side surfaces 10 and 11 of the complete ring; also, that as the division between the vertical walls of the two parts is cylindrical with its axis eccentric to the axis of the conical surfaces and that as the inner boundaries of said contacting conical surfaces are determined by the intersection of cylindrical and conical surfaces, eccentrically arranged, said boundaries must assume reverse or double helical shape, as they gradually extend down the conical surfaces in both directions from the highest to the lowest points thereon.

I claim:—

In a piston packing, a main ring having a vertical wall with its inner side concentric and its outer side eccentric to the axis of the ring and having a conical flange extending from the eccentric outer side of the vertical wall, the boundary of the conical surface of the flange contiguous the eccentric outer side of the vertical wall being reverse helices extending downwardly from the narrow to the thick part of the vertical wall, in combination with an eccentric conical ring conformable with the conical flange and the outer eccentric side of the vertical wall of the main ring, each of said rings being slit at or near its smallest cross sectional area.

Signed at New York, county and State of New York, this 14th day of March, 1917.

JOHN J. CAIN.

In the presence of—
Wm. J. Dolan,
James A. Hudson.